US007865910B2

(12) United States Patent
Durojaiye et al.

(10) Patent No.: US 7,865,910 B2
(45) Date of Patent: Jan. 4, 2011

(54) BYPASSING CLASS DRIVERS THROUGH VIRTUAL DRIVER ENABLEMENT

(75) Inventors: Olumuyiwa M. Durojaiye, Bothell, WA (US); Steven P. Dodge, Sammamish, WA (US); Bryan D. Scott, Bothell, WA (US); Doron J. Holan, Seattle, WA (US); Eliyas Yakub, Issaquah, WA (US); Reed L. Townsend, Seattle, WA (US); Michael Tsang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1194 days.

(21) Appl. No.: 11/495,873

(22) Filed: Jul. 28, 2006

(65) Prior Publication Data

US 2008/0127228 A1 May 29, 2008

(51) Int. Cl.
*G06F 3/00* (2006.01)
(52) U.S. Cl. .................... 719/324; 719/322; 719/327

(58) Field of Classification Search ................ None
See application file for complete search history.

(56) References Cited

U.S. PATENT DOCUMENTS

| 6,813,650 B1* | 11/2004 | Cato et al. ................ 710/14 |
| 2005/0179674 A1* | 8/2005 | Mehrotra et al. ............ 345/179 |
| 2007/0079050 A1* | 4/2007 | Reckless et al. ............. 711/100 |

* cited by examiner

*Primary Examiner*—Van H Nguyen
*Assistant Examiner*—Tuan Dao
(74) *Attorney, Agent, or Firm*—Merchant & Gould, P.C.

(57) ABSTRACT

A virtual driver is enabled and a class driver is bypassed to provide at least one functionality different than that of the bypassed class driver. A filter driver is initialized in the stack of a class driver in order to bypass the class driver. The filter driver receives inputs associated with the input device and/or application emulating an input device and passes the input data to a virtual driver. The virtual driver provides data to an operating system for functionality that is at least partially different than that of the bypassed class driver.

20 Claims, 6 Drawing Sheets

BYPASSING CLASS DRIVERS THROUGH VIRTUAL DRIVER ENABLEMENT

BACKGROUND

When an input device or application emulating an input device is connected to a computing system, hardware class drivers associated with the input device are initialized to provide communication between the input device and an operating system. In some situations, an input device may use a hardware class driver from a different, more common, input device type to facilitate communication in a standard manner with the operating system. As an example, touch digitizers are often associated with mouse class drivers. Such an arrangement limits the functionality of the touch digitizer to that of a mouse device. Also, such a situation, limits the functionality an operating system makes available to a user of the machine for the input device.

SUMMARY

This Summary is provided to introduce a selection of concepts in a simplified form that are further described below in the Detailed Description. This Summary is not intended to identify key and/or essential features of the claimed subject matter. Also, this Summary is not intended to limit the scope of the claimed subject matter.

A virtual driver is enabled and a class driver is bypassed to provide at least one functionality different than that of the bypassed class driver. A filter driver is initialized in the stack of a class driver in order to bypass the class driver. The filter driver receives inputs associated with the input device and/or application emulating an input device and passes the input data to a virtual driver. The virtual driver provides data to a configuration manager for functionality that is at least partially different than that of the bypassed class driver.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope. Embodiments may be practiced as methods, systems or devices. Accordingly, embodiments may take the form of an entirely hardware implementation, an entirely software implementation or an implementation combining software and hardware aspects. The following detailed description is, therefore, not to be taken in a limiting sense.

The logical operations of the various embodiments are implemented (1) as a sequence of computer implemented steps running on a computing system and/or (2) as interconnected machine modules within the computing system. The implementation is a matter of choice dependent on the performance and/or functionality requirements of the computing system implementing the invention. Accordingly, the logical operations making up the embodiments described herein are referred to alternatively as operations, steps or modules.

When an input device is connected to a computing system, hardware class drivers associated with the input device are initialized, according to an identification code the device may provide during initialization, to provide communication between the input device and an operating system. For example, a mouse may be connected to a computing device via a Universal Serial Bus (USB) port. Inputs associated with the mouse are directed through a mouse class driver so that an operating system can utilize inputs from the mouse. Also, in many situations, an input device may use a hardware class driver from a different or more common input device type to facilitate communication with the operating system. For example, a digitizer may initialize a mouse class driver to provide basic communication with an operating system. Such a situation limits the functionality of the digitizer to that of a mouse because the mouse class driver recognizes mouse only device inputs. Such a configuration may be implemented because device manufactures are not knowledgeable regarding writing certain types of function drivers. Such a configuration may also be implemented because not all operating systems take advantage of the full functionality of the input device and can utilize the hardware class driver of another input device type for most purposes.

A virtual driver is enabled and a class driver is bypassed to provide at least one different input device functionality than that of the bypassed class driver. In another aspect, an input device is emulated by an application. A virtual driver is enabled and a class driver is bypassed to provide at least one different emulated input device functionality than that of the bypassed class driver. A filter driver is initialized in the normal driver stack for the hardware device or emulated hardware device to bypass the normal class driver. The filter driver receives inputs associated with the input device and passes the input data to a virtual driver. The virtual driver may provide functionality to a configuration manager different than that of the bypassed class driver. In this manner, rich functionality of an input device or emulated input device may be used by an operating system without being restricted by a class driver. As an example with a digitizer, touch confidence functionality may be enabled (or simulated) to determine when a touch is an input or a non-input touch. As another example with a digitizer, contact size functionality may be enabled to determine a type of touch input. Also, device or software manufactures do not need to be concerned with the type of operating system that the device or software is ultimately associated. Furthermore, users of existing input devices or software can benefit from additional or enhanced functionality in operating systems without having to update their existing device.

Figure 1:
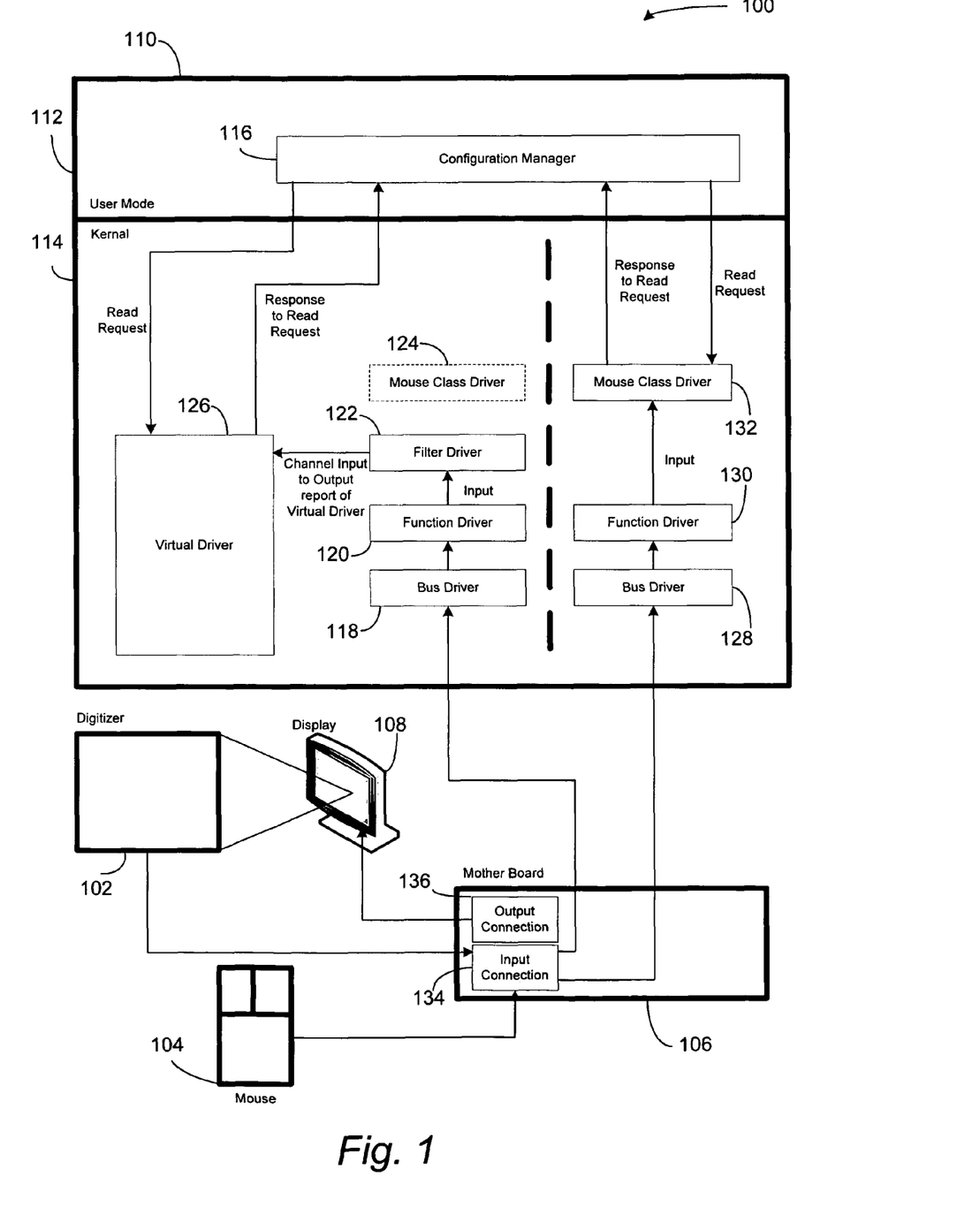
FIG. 1 represents an exemplary system overview for bypassing class drivers through virtual driver enablement.

FIG. 1 represents one exemplary system overview for bypassing class drivers through virtual driver enablement. System 100 may include aspects of a computing device. The computing device may include a desktop computing device, mobile computing device, a laptop, a personal digital assistant, a notebook computer, a telephone, a cellular telephone, a kiosk computing device and/or any other type of computing device that may be configured to interpret inputs from an input device or emulated input device. In one aspect, the computing device includes computing device 400 as exemplified in FIG. 4.

System 100 includes digitizer 102, mouse 104, and mother board 106. The digitizer 102, mouse 104 and mother board 106 are included in FIG. 1 for exemplary purposes only. The disclosure herein may include any type and any combination of hardware elements for association with system 100. For example, digitizer 102 and mouse 104 are presented herein as two different types of input devices. The disclosure herein pertains to other types of input devices such as an input pen, a joystick, a keyboard, a tactile input device, an audio input device a visual input device or any other type of input device functional to provide an input into system 100. System 100 also includes display 108. Likewise, system 100 is not limited to such an output device. Other output devices that apply to the disclosure include a printer, a fax, a visual output device, a tactile output device, an auditory output device and/or any other type of output device for communicating an output from system 100. In another embodiment, system 100 includes emulated input devices. In such a situation, driver stacks receive input data from an application that emulates a hardware device input. As set forth in this disclosure, the term "input device" means a hardware input device, an emulated hardware device, and/or a combination of a hardware input device and an emulated hardware device. Accordingly, the disclosure herein, is not limited to receiving an input from hardware device.

System 100 is also represented by operation flow diagram 110. Operational flow diagram 110 represents elements of the disclosure associated with the initialization of one or more drivers for one or more input devices. Operational flow diagram 110 depicts a driver stack associated with two different input devices. Such a depiction is for exemplary purposes only. The disclosure pertains to a driver stack for a single input device, several input devices, and emulated input device, and the combination of an input device and an emulated input device. The depiction of two driver stacks is for an example more fully set forth below.

In one embodiment, operational flow diagram 110 includes user mode 112 and kernel 114. User mode 112 includes one or more configuration managers 116. Even though configuration manager 116 is depicted as part of the user mode 112, configuration manager may be associated with kernel 114 or a kernel driver. In a first exemplary scenario, Kernel 114 includes bus driver 118, function driver 120, filter driver 122, mouse class driver 124 and virtual driver 126. In another scenario, kernel 114 includes bus driver 128, function driver 130 and mouse class driver 132. As stated, these scenarios are exemplary. Kernel 114 may include any combination of scenarios depending on the number and type of input devices or emulated input devices. Even though the elements associated with module 110 are represent as separate elements, they may be integrated as a single element performing several functions. This disclosure is not limited to a single element or various elements in communication with one another.

System 100 includes digitizer 102. Digitizer 102 may include a digitizer for positioning on a front face of a display, an electromagnetic digitizer for positioning behind a display, an emulated digitizer or any other type of digitizer for receiving an input. In one aspect, digitizer 102 includes a digitizer for receiving a touch input. Display 108 may include a display association with a computing device such as a desktop computing device, mobile computing device, a laptop, a personal digital assistant, a notebook computer, a table pc, a telephone, a cellular telephone, or a kiosk computing device. Mouse 104 may include any type of mouse device or emulated mouse device for causing an input into system 100. Digitizer 102 and mouse 104 may be in communication with input connection 134, and display 108 is in communication with output connection 136. Input connection 134 may include a USB connection, serial connection and/or any other type of input connection for facilitating an input. Similarly, output connection 136 may include an S-video output connection, high definition output connection, and/or any other type of output connection for facilitating an output.

In one embodiment, input connection 134, output connection 136, and elements of mother board 106 facilitate the initialization of drivers during an initialization operation of an input device. In one example, an input device may include mouse 104 having an associated mouse class driver 132. Mouse 104 causes an input and bus driver 128 detects the input. Bus driver 128 passes the data to function driver 130. Function driver 130 interprets the data. The input is passed to mouse class driver 132. Mouse class driver responds to a read request from configuration manager 116. Configuration manager 116 may process the data to display the functionality of the mouse input on display 108. In this situation, configuration manager 116 interprets the response as coming from a mouse device.

In another example, the input device may include digitizer 102. Digitizer 102 may be associated with mouse class driver 124. Digitizer 102 causes an input and bus driver 118 detects the input. Bus driver 118 passes the data to function driver 120. Function driver 120 interprets the data. The input data is then sent to filter driver 122 as opposed to mouse class driver 124. In another embodiment, filter driver 122 optionally receives the input data. Stated another way, filter driver 122 may by "turned on or off" depending on whether a user desires the digitizer to function as a mouse device or a digitizer device. If the input data was sent to mouse class driver 124, digitizer 102 would be associated with the same functionality as mouse 104 as described above in the mouse device scenario. However, if filter driver 122 receives the input data and routes the data to virtual driver 126, functionality associated with virtual driver 126 is enabled as more fully set forth below. In one aspect of the disclosure, virtual driver 126 includes two top level collections in its report descriptor. In one embodiment, the first top level collection has only a read report and the second top level collection has only an output report. Filter driver 122 detects the virtual driver and opens an output report of the virtual driver for access. The access may be exclusive to prevent other components from accessing the output report. Filter driver 122 channels the input data to the output report of the virtual driver. Virtual driver 126 configures the data for digitizer 102, and virtual driver 126 completes outstanding read requests from configuration manager 116 with the output report. Virtual driver 126 may include separate input and output reports to facilitate communication with filter driver 122 and configuration manager 116. In this situation, a configuration manager or configuration managers do not interpret the response to the request as coming from a mouse device. In this situation, a configuration manager or configuration managers interpret the response to the request as coming from a digitizer device even though mouse class driver 124 is initialized. In other aspects, configuration manager, virtual driver 126, and filter driver 122 may communicate in association with named pipes, a shared memory section, passing a name of a file handle to open, and/or a private channel.

Filter driver 122 and/or virtual driver 126 may also include data specialization functionality. For example when the data is received, coordinates may be transformed to better associate with a touch input of digitizer 102. Filter driver 122 and/or virtual driver 126 may also calibrate the data to compensate for an offset associated with a digitizer's position on a display. Filter driver 122 and/or virtual driver 126 may further correct errors associated with a touch input. As another example, filter driver 122 and/or virtual driver 126 may smooth the data input to correct "noise" associated with a touch input. In general, filter driver 122 and/or virtual driver 126 may include any type of data specialization functionality to make the functionality of the digitizer available to user mode component 116.

In this manner, virtual driver 126 provides functionality to configuration manager 116 at least partially different than that of the bypassed mouse class driver 124. As such, rich functionality of digitizer 102 may be used by an operating system without being restricted by mouse class driver 124. As is evident from the disclosure herein, any type of class driver may be bypassed by a filter driver and passed to a virtual driver regardless of the type of hardware associated therewith and/or emulated hardware associated therewith.

Figure 2:
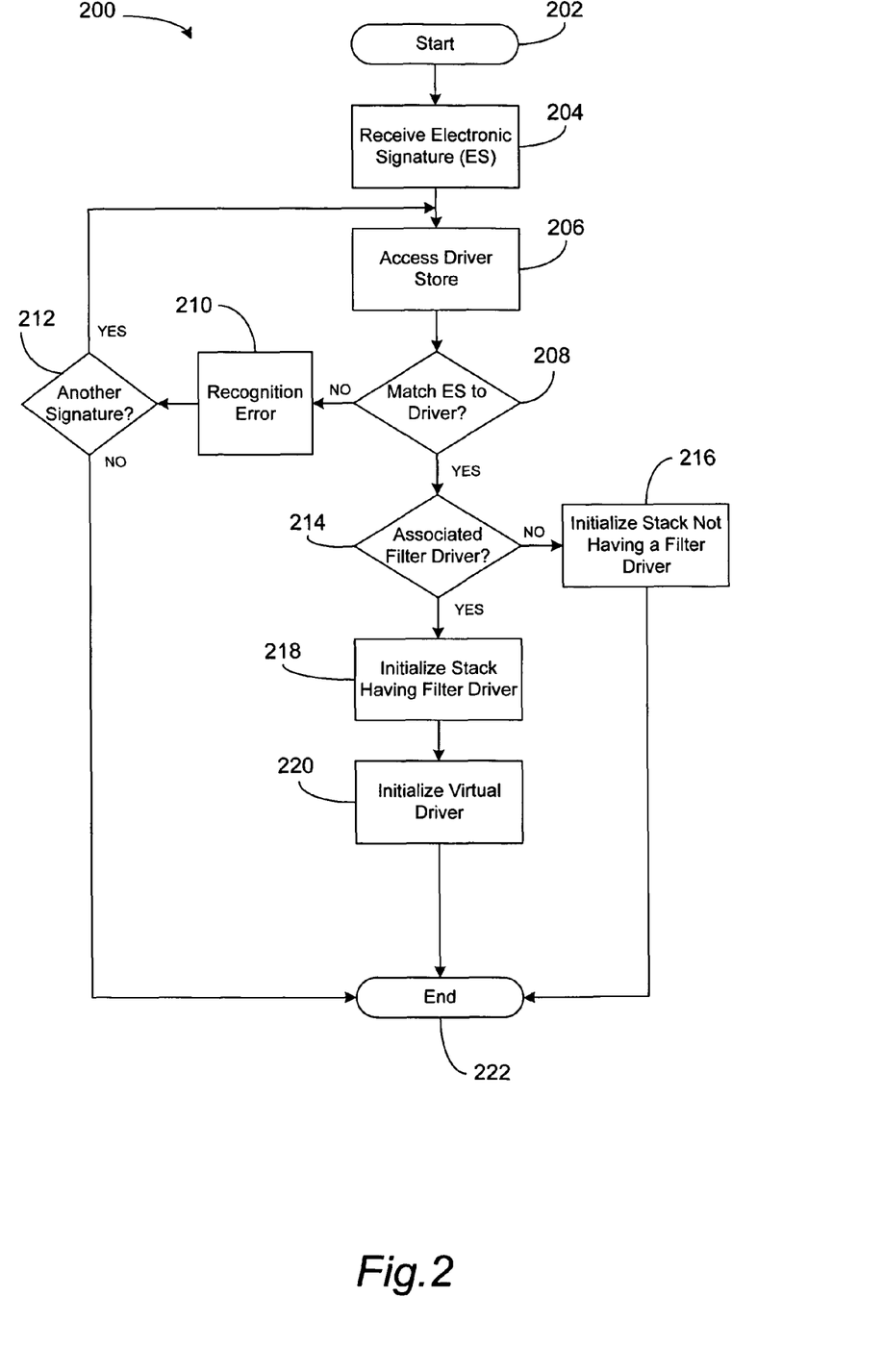
FIG. 2 represents an exemplary flow diagram for initializing a filter driver and a virtual driver.

FIG. 2 represents an exemplary flow diagram for initializing a filter driver and a virtual driver. Operation flow 200 begins at start operation 202 and flows to operation 204 where an electronic signature for a hardware device is received. In the situation where the hardware device is an emulated hardware device, the electronic signature may be a flag or indicator identifying the emulated hardware device. An electronic signature may be initiated by plugging in a device, loading a device or turning on a device. In one aspect a plug-and-play manager receives the electronic signature of the device and obtains a hardware identification from the signature.

Operational flow 200 continues to operation 206 where a driver store is accessed. The driver store may include a set of drivers for several device types. Operation flow 200 continues to decision operation 208 where it is determined whether the electronic signature matches a driver stack. When the electronic signature does not match any of the driver stacks associated with the driver store, operational flow 200 continues to operation 210 where a recognition error occurs. Stated another way, the system does not recognize the device connected to the system. Operational flow 200 continues to decision operation 212 where it is determined whether another electronic signature is received. When another electronic signature is received, operation flow 200 loops back to operation 206 where the driver store is again accessed. When another electronic signature is not received, operational flow 200 continues to end operation 222.

When, at decision operation 208, the electronic signature matches a driver stack associated with the driver store, operational flow 200 continues to decision operation 214. At decision operation 214, it is decided whether the driver stack includes an associated filter driver. When the driver stack does not include an associated filter, operation flow continues to operation 216 where the stack that does not have the filter driver is initialized. As an example with reference to FIG. 1, a driver stack including bus driver 128, function driver 130 and mouse class driver 132 may be initialized. In this example, a filter driver may not exist because mouse device 104 is connected to mouse class driver 132. From a functionality standpoint, in most situations, the functionality of the mouse is optimal to user mode component 116 because all the functionality of the mouse is interpreted by mouse class driver 132. Operational flow 200 continues to end operation 222

When, at decision operation 214, it is decided that the driver stack includes an associated filter driver. Operational flow 200 continues to operation 218 where the stack that includes the filter driver is initialized. As an example with reference to FIG. 1, a driver stack including bus driver 118, function driver 120, filter driver 122, and mouse class driver 132 may be initialized. In one embodiment, mouse class driver 124 is initialized and receives input data when the filter driver does not optionally bypass mouse class driver 124. Mouse class driver 124 is depicted in FIG. 1 as dashed lines because, in one aspect, mouse class driver 124 is initialized, but mouse class driver 124 does not receive input data. In this example, a filter driver may exist to bypass mouse class driver 124. From a functionality standpoint, if digitizer data was sent to mouse class driver 124, digitizer 102 would be associated with the same functionality as a mouse. However, in this situation, filter driver 122 receives the digitizer data and routes the data to virtual driver 126 to provide a richer functionality than could be provided by mouse class driver 124.

Operational flow 200 continues to operation 220 where the virtual driver is initialized. Even though operational flow 200 depicts operation 220 following operation 218, operation 220 may come before operation 218, or operation 220 and operation 218 may be associated with the same operation. In one aspect, the virtual driver is initialized by a plug-and-play manager in association with a registry key. When the virtual driver is initialized, operational flow 200 continues to end operation 222.

Figure 3:
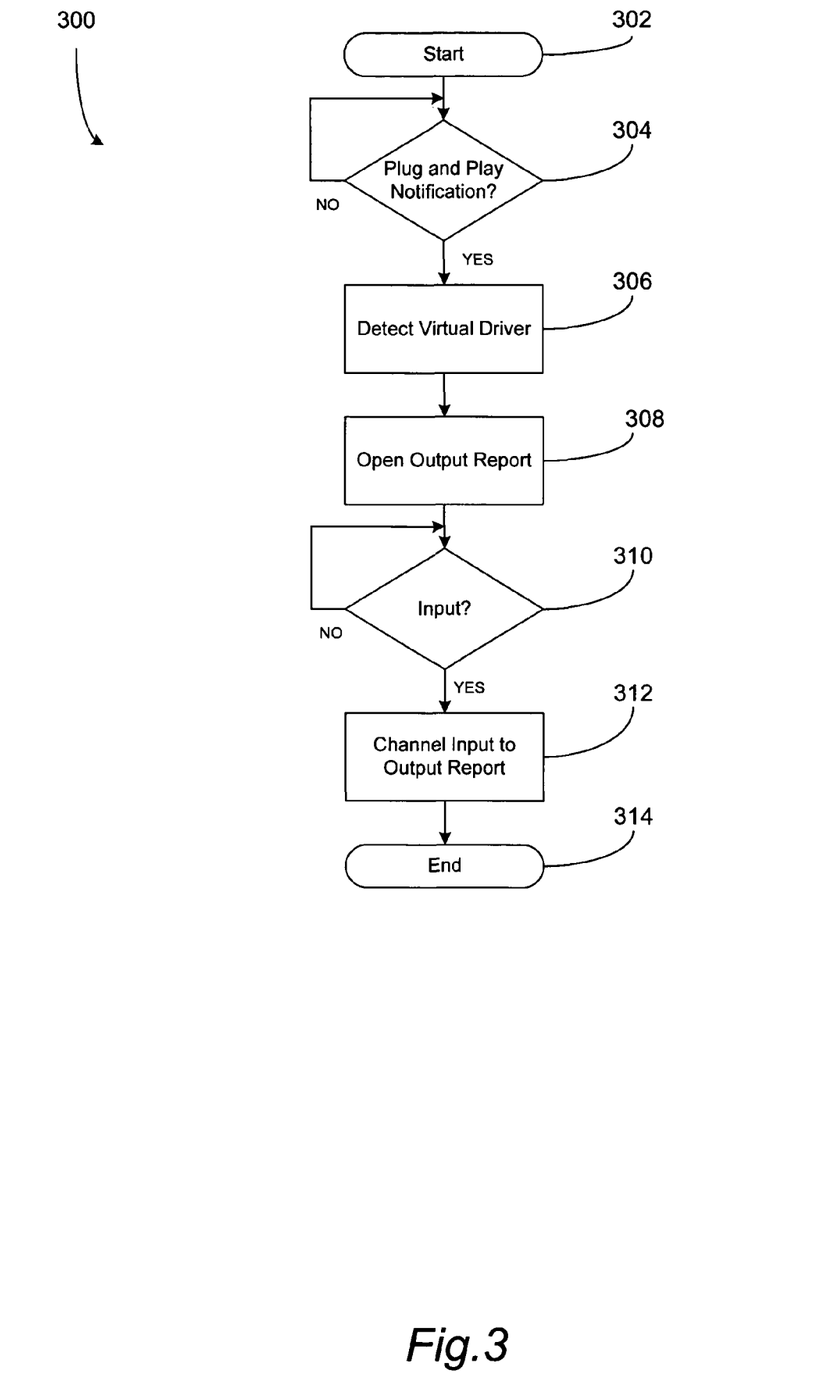
FIG. 3 represents an exemplary flow diagram for sending data to the virtual driver.

FIG. 3 represents an exemplary flow diagram for sending data to the virtual driver. Operational flow 300 begins at start operation 302 and continues to decision operation 304 where it is determined whether a plug and play notification is detected. In another aspect, the notification may include any type of notification for indicating that the virtual driver is available. When the plug and play notification is not detected, operational flow 300 loops back until a plug and play notification is detected. When a plug and play notification is detected, operational flow 300 continues to operation 306.

At operation 306, the filter driver detects the virtual driver. Operational flow 300 continues to operation 308 where the output report of the virtual driver is opened. In one aspect, the output report of the virtual driver is opened for exclusive access for the filter driver to prevent other components from opening the output report.

Operational flow 300 continues to decision operation 310, where it is determined whether the filter driver detects an input. For example, the filter driver may detect an input from a mouse device. When an input is not detected, operational flow 300 loops back until an input is detected. When an input is detected, operation flow 300 continues to operation 312 where the input is channeled to the output report of the virtual driver. Operational flow 300 continues to end operation 314.

Even though operational flow 300 is described in association with an output report, the filter driver may also communicate with the virtual driver in association with named pipes, a shared memory section, and/or a private channel.

Figure 4:
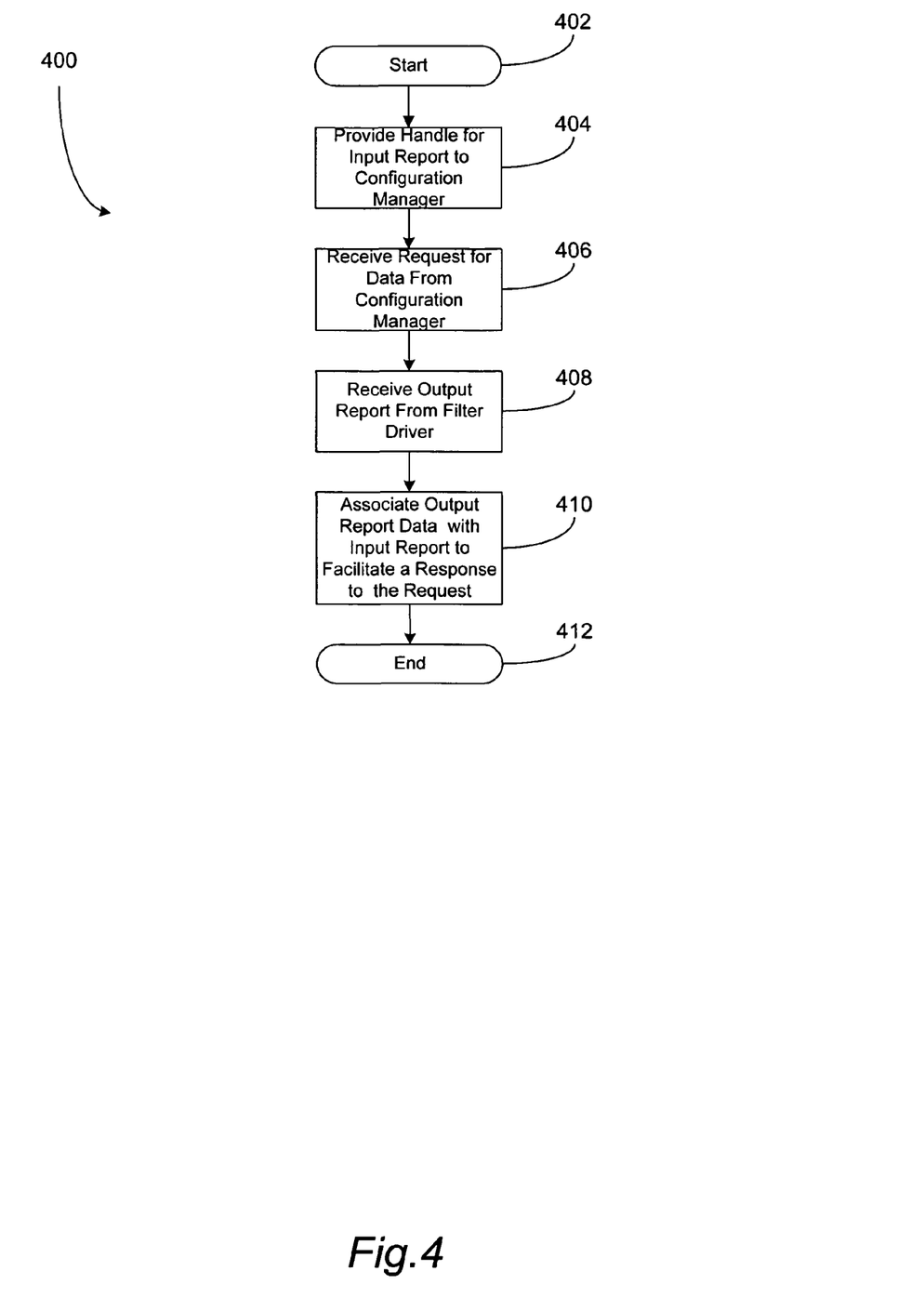
FIG. 4 represents an exemplary flow diagram for responding to a request from a configuration manager.

FIG. 4 represents an exemplary flow diagram for responding to a request from a configuration manager. Operational flow 400 begins at start operation 402 and continues to operation 404 where a handle is provided to one or more configuration managers for access to the input report of the virtual driver. Operational flow 400 continues to operation 406 where the virtual driver receives a request from the user mode component for data. The virtual driver receives output report data from the filter driver as indicated by operation 408. In one aspect, the virtual driver includes two separate top level collection reports. These reports include the output report and the input report. The separate top level collection reports facilitate limited access to the reports. Operational flow 400 continues to operation 410 where the output report data is associated with the input report to facilitate a response to any requests by configuration managers having a handle associated with the input report. In associating the data with the input report, the virtual driver configures the data to provide different functionality than that of a bypassed class driver. Operational flow 400 continues to end operation 412.

Even though operational flow 400 is described in association with an output report, the configuration manager may also communicate with the virtual driver in association with named pipes, a shared memory section, and/or a private channel.

Figure 5:
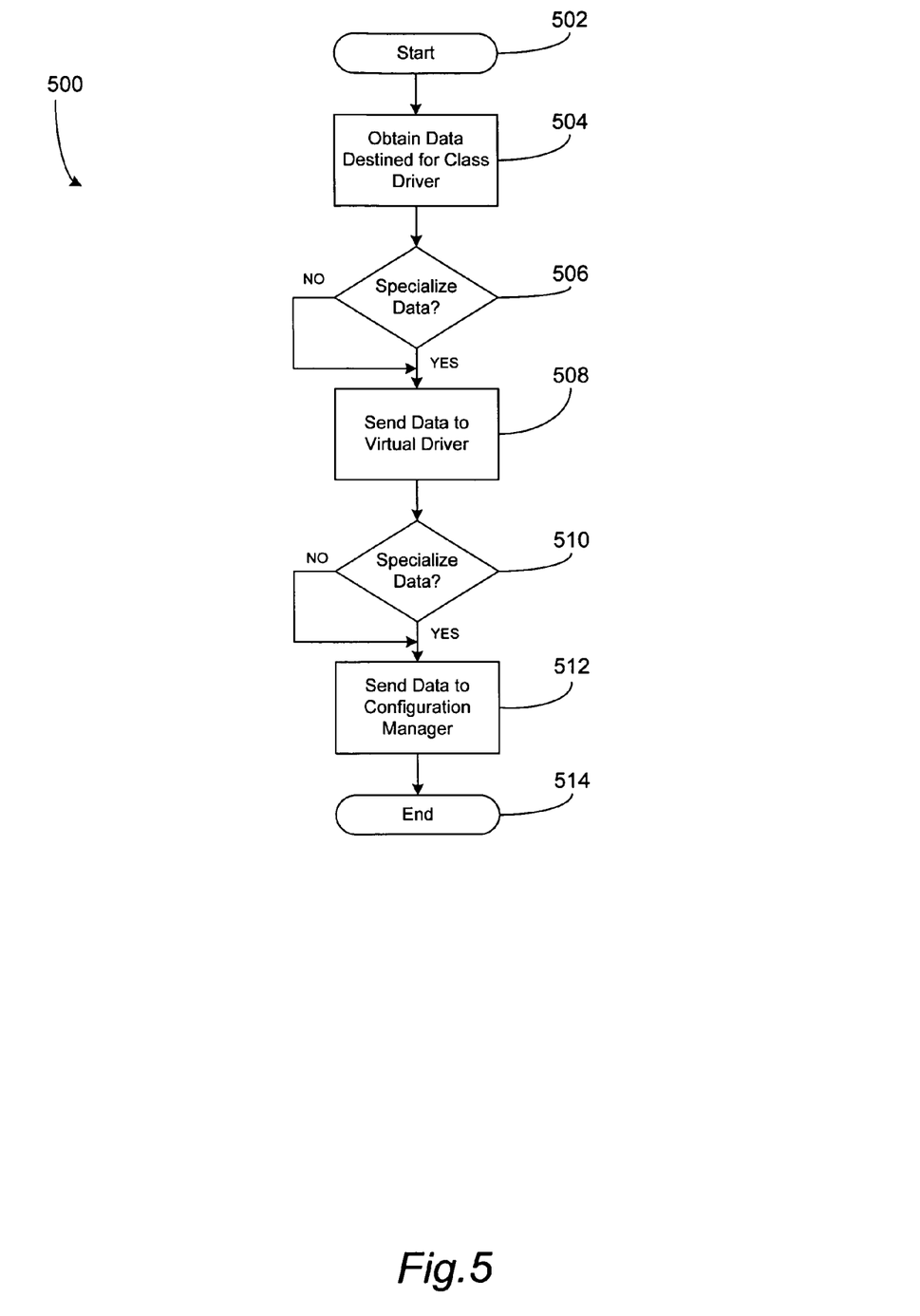
FIG. 5 represents an exemplary high level flow diagram for data specialization functionality.

FIG. 5 represents an exemplary high level flow diagram for data specialization functionality. Operational flow 500 begins at operation 502 and continues to operation 504 where the filter driver obtains data destined for a class driver. Operational flow 500 continues to decision operation 506 where it is decided whether the filter driver specializes the data. Data specialization may include transforming coordinates of the data to better align with the input device. Data specialization may also include calibrating the data to compensate for an offset associated with the input device. Data specialization my further include correcting errors associated with an input of the input device. As another example, data specialization may include smoothing a data input to correct "noise" associated with an input. In general, data specialization may include any type of data specialization functionality to make the specialized functionality available to an operating system. When it is decided to specialize the data, operational flow 500 continues to operation 508. Likewise when it is decided not to specialize the data, operational flow 500 continues to operation 508.

At operation 508, the data is sent to the virtual driver as previously discussed. Operational flow 500 continues to decision operation 510 where it is decided whether the virtual driver specializes the data. As stated, data specialization may include transforming coordinates of the data to better align with the input device. Data specialization may also include calibrating the data to compensate for an offset associated with the input device. Data specialization my further include correcting errors associated with an input of the input device. As another example, data specialization may include smoothing a data input to correct "noise" associated with an input. In general, data specialization may include any type of data specialization functionality to make the specialized functionality available to an operating system. When it is decided to specialize the data, operational flow 500 continues to operation 512. Likewise when it is decided not to specialize the data, operational flow 500 continues to operation 512.

At operation 512, the virtual driver sends the data to the configuration manager as previously discussed above. Operational flow continues to end operation 514.

As is evident from the disclosure herein, other combinations of input devices, emulated input devices, class drivers, and virtual drivers are contemplated. For example, the input device may include a keyboard, the hardware class driver may include a keyboard class driver, and the virtual driver may include a virtual mouse driver. In such a situation, the operating system would open mouse functionality to the keyboard. As another example, the input device may include a joystick, the hardware class driver may include a joystick class driver and the virtual driver may include a virtual mouse driver. In such a situation, the operating system would open mouse functionality to the joystick. As yet another example, joystick manufactures may implement mouse drivers for joysticks. In such a situation, a filter driver may be implemented to bypass the mouse class driver and route input data to a virtual joystick driver so the operating system can open joystick functionality to the joystick.

Figure 6:
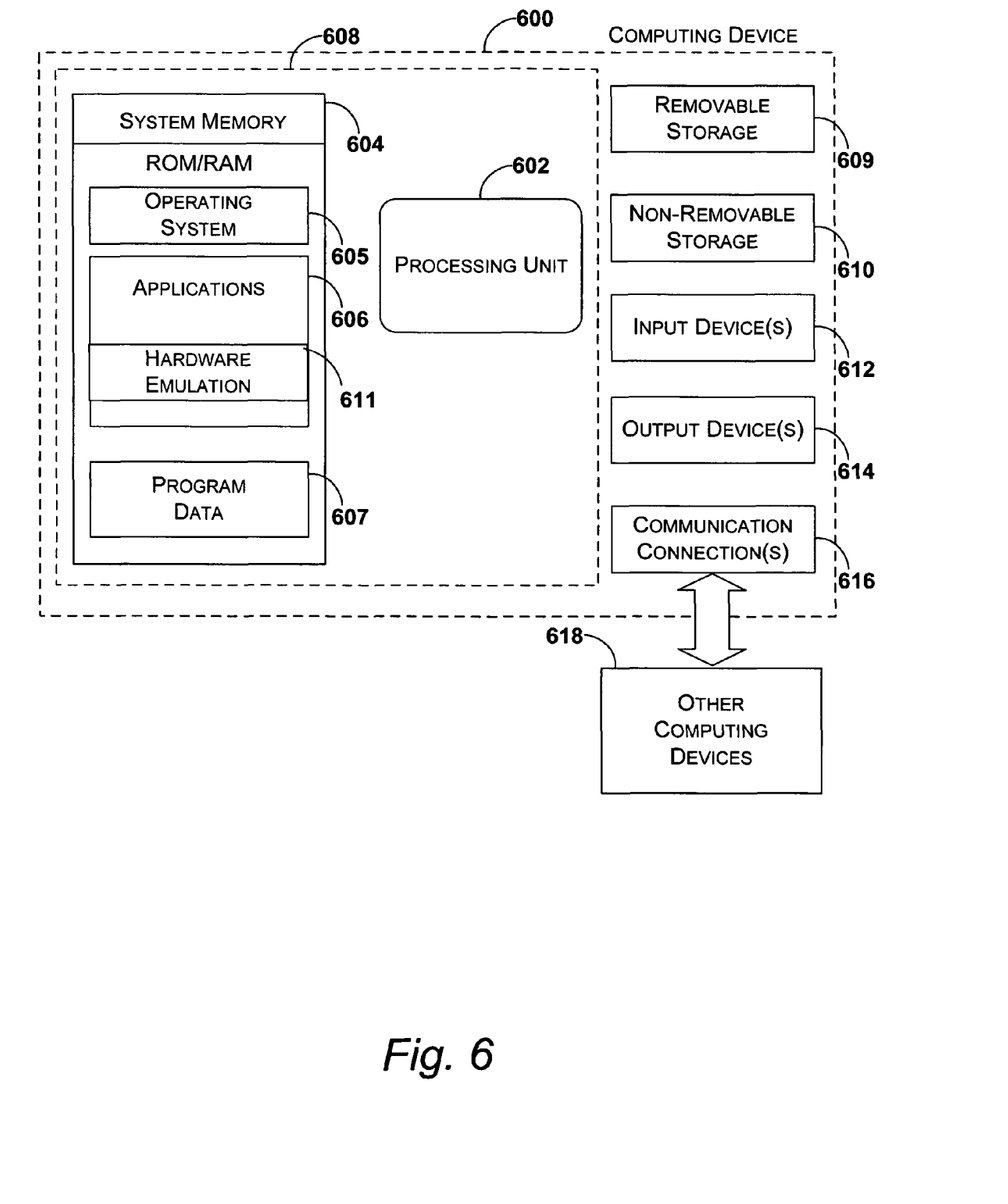
FIG. 6 represents an exemplary computing system for facilitating bypassing class drivers through virtual driver enablement.

Referring to FIG. 6, an exemplary system for implementing the invention includes a computing device, such as computing device 600. In a basic configuration, computing device 600 may include any type of stationary computing device or a mobile computing device. Computing device 600 typically includes at least one processing unit 602 and system memory 604. System memory 604 typically includes operating system 605, one or more applications 606, and may include program data 607. Applications 606 may include application 611 for emulating a hardware device. This basic configuration is illustrated in FIG. 6 by those components within dashed line 608.

Computing device 600 may also have additional features or functionality. For example, computing device 600 may also include additional data storage devices (removable and/or non-removable). Such additional storage is illustrated in FIG. 6 by removable storage 609 and non-removable storage 610. Computing device 600 may also have input device(s) 612 such as a keyboard, mouse, pen, voice input device, touch input device, digitizers, etc. Output device(s) 614 such as a display, speakers, printer, etc. may also be included.

Computing device 600 also contains communication connection(s) 616 that allow the device to communicate with other computing devices 618, such as over a network or a wireless network. Communication connection(s) 616 is an example of communication media. Communication media typically embodies computer readable instructions, data structures, program modules or other information delivery media.

Although the invention has been described in language that is specific to structural features and/or methodological steps, it is to be understood that the invention defined in the appended claims is not necessarily limited to the specific features or steps described. Rather, the specific features and steps are disclosed as forms of implementing the claimed invention. Since many embodiments of the invention can be made without departing from the spirit and scope of the invention, the invention resides in the claims hereinafter appended.

What is claimed is:

1. A computer-implemented method for bypassing a class driver, the method comprising:

receiving a signature of an input device, wherein the signature is associated with a digitizer;

recognizing the digitizer as a mouse class device;

in response to recognizing the digitizer as a mouse class device, initializing a driver stack having a mouse class driver;

determining whether the driver stack is associated with a filter driver;

when the driver stack is associated with the filter driver,
 initializing the filter driver in the driver stack below the mouse class driver to bypass the mouse class driver;
 initializing a virtual driver to communicate with the filter driver and at least one configuration manager, wherein initializing the virtual driver includes opening an output report of the virtual driver for access by the filter driver, opening an input report of the virtual driver, and providing a handle of the input report to the at least one configuration manager;

receiving input data from the digitizer recognized as the mouse class device;

bypassing the mouse class driver by routing the input data through the filter driver to the output report of the virtual driver;

causing the virtual driver to specialize the input data according to at least one function of the virtual driver;

providing the specialized input data to the at least one configuration manager; and causing a computer processor to process the specialized input data to recognize the specialized input data for an application in communication with the configuration manager.

2. The computer-implemented method of claim 1, wherein the digitizer is at least one of a hardware digitizer and an emulated digitizer.

3. The computer-implemented method of claim 1, wherein the signature is a flag indicator.

4. The computer-implemented method of claim 1, wherein the input data from the digitizer is recognized as a mouse input.

5. The computer-implemented method of claim 1, wherein causing the virtual driver to specialize the input data includes transforming coordinates associated with an input location of the input data.

6. The computer-implemented method of claim 1, wherein causing the virtual driver to specialize the input data includes compensating for an offset associated with the input data.

7. The computer-implemented method of claim 1, wherein causing the virtual driver to specialize the input data includes executing a data smoothing function to correct noise associated with the input data.

8. A computer-readable storage medium having computer executable instructions for bypassing a class driver, the instructions for performing operations comprising:

receiving a signature of an input device, wherein the signature is associated with an input device having a first class type;

recognizing the input device as an input device having a second class type;

in response to recognizing the input device as a device having a second class type, initializing a driver stack having a second class type driver;

determining whether the driver stack is associated with a filter driver;

when the driver stack is associated with the filter driver, initializing the filter driver in the driver stack below the second class type driver to bypass the second class type driver, initializing a virtual driver to communicate with the filter driver and at least one configuration manager;

receiving input data from the input device recognized as the input device having the second class type; and bypassing the second class type driver by routing the input data through the filter driver to the virtual driver, wherein the input data is specialized by at least one of the filter driver and the virtual driver.

9. The computer-readable storage medium of claim 8, wherein the first class type is a touch input class.

10. The computer-readable storage medium of claim 8, wherein the second class type is a mouse class.

11. The computer-readable storage medium of claim 8, wherein the input device is at least of a hardware input device and an emulated input device.

12. The computer-readable storage medium of claim 8, wherein the input data is specialized by transforming coordinates associated with an input location of the input data.

13. The computer-readable storage medium of claim 8, wherein the input data is specialized by compensating for an offset associated with the input data.

14. The computer-readable storage medium of claim 8, wherein the input data is specialized by executing a data smoothing function to correct noise associated with the input data.

15. A system for bypassing a class driver, the system comprising:

at least one processor; and at least one memory having computer executable instructions stored thereon, wherein the computer executable instructions are configured for performing operations, comprising:

receiving a signature of an input device;

recognizing the input device as a mouse class device;

in response to recognizing the input device as a mouse class device, initializing a driver stack having a mouse class driver;

determining whether the driver stack is associated with a filter driver;

when the driver stack is associated with the filter driver, initializing the filter driver in the driver stack below the mouse class driver to bypass the mouse class driver, initializing a virtual driver to communicate with the filter driver and at least one configuration manager;

receiving input data from the input device recognized as the mouse class device;

bypassing the mouse class driver by routing the input data through the filter driver to the virtual driver; and causing specialization of the input data by at least one of the filter driver and the virtual driver.

16. The system of claim 15, wherein the input device is at least one of a hardware digitizer and an emulated digitizer.

17. The system of claim 16, wherein the input data from the digitizer is recognized as a mouse input.

18. The system of claim 15, wherein causing specialization of the input data includes transforming coordinates associated with an input location of the input data.

19. The system of claim 15, wherein causing specialization of the input data includes compensating for an offset associated with the input data.

20. The system of claim 15, wherein causing specialization of the input data includes executing a data smoothing function to correct noise associated with the input data.

* * * * *